(12) United States Patent
Gaertner et al.

(10) Patent No.: US 6,811,194 B1
(45) Date of Patent: Nov. 2, 2004

(54) GARNISH AND SEAL ASSEMBLY FOR A VEHICLE BODY PORTION, AND METHOD OF ATTACHING SAME

(75) Inventors: Brent Gaertner, Columbus, OH (US); Kazuo Onodera, Worthington, OH (US); Lawrence Geise, Hilliard, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/613,163

(22) Filed: Jul. 3, 2003

(51) Int. Cl.[7] .............................................. B60J 10/08
(52) U.S. Cl. ................. 296/1.08; 296/146.1; 296/146.9
(58) Field of Search ........................... 47/502; 296/191, 296/193.01, 209, 146.1, 146.2, 146.7, 146.9, 1.08, 135; 49/489.1, 475.1, 483.1, 490.1, 493.1

(56) References Cited

U.S. PATENT DOCUMENTS

| | | | |
|---|---|---|---|
| 4,461,507 A | 7/1984 | Minami et al. | |
| 4,653,802 A | 3/1987 | Watanabe et al. | |
| 5,163,730 A | 11/1992 | Welch | |
| 5,346,273 A | 9/1994 | Takeuchi | |
| 5,527,583 A | 6/1996 | Nozaki et al. | |
| 5,735,081 A | 4/1998 | Yamanaka et al. | |
| 5,803,532 A | 9/1998 | Karuppaswamy et al. | |
| 5,806,247 A | 9/1998 | Yamamoto | |
| 5,992,924 A | 11/1999 | Noritake et al. | |
| 6,131,342 A | 10/2000 | Miyamoto et al. | |
| 6,142,506 A | 11/2000 | Patel et al. | |
| 6,189,951 B1 | 2/2001 | Deguchi | |
| 6,309,011 B1 | 10/2001 | Matsuyama et al. | |
| 6,397,525 B1 | 6/2002 | Ishibashi et al. | |
| 6,435,602 B1 * | 8/2002 | Sukegawa et al. | 296/191 |
| 6,536,834 B2 | 3/2003 | Yamashita et al. | |
| 6,644,718 B2 * | 11/2003 | Nozaki | 296/146.9 |
| 2001/0038227 A1 * | 11/2001 | Enomoto et al. | 296/146.1 |

* cited by examiner

Primary Examiner—Jason Morrow
(74) Attorney, Agent, or Firm—Carrier, Blackman & Associates, P.C.; William D. Blackman; Joseph P. Carrier

(57) ABSTRACT

A garnish cooperates with weather strip material to seal an opening in a vehicle body portion. The garnish has a plurality of slots formed in selected portions thereof. In one illustrative embodiment, the garnish is attachable to a door sash frame. The door sash frame is provided with a outer weather strip seal and a plurality of seal clips which are inserted through selected slots in the garnish, thereby concurrently affixing both the garnish and outer weather strip seal to the door sash frame, to contribute to a secure, efficient, and quiet seal for the vehicle opening.

12 Claims, 8 Drawing Sheets

GARNISH AND SEAL ASSEMBLY FOR A VEHICLE BODY PORTION, AND METHOD OF ATTACHING SAME

BACKGROUND OF THE INVENTION

1. Field of the Invention

The present invention relates to a molding garnish and to a garnish and seal assembly, for cooperating with weather strip elements to seal vehicle openings from noise, water, and external temperatures, and for providing an aesthetically pleasing appearance to a vehicle. More particularly, the present invention relates to a garnish and to a garnish and seal assembly for attachment to a vehicle body component, such as a door, adjacent an opening in the vehicle body, to help seal the passenger compartment from the exterior of the vehicle. The invention also relates to a method of attaching a garnish and weather strip seal to a vehicle body portion.

2. Description of the Background Art

Vehicles have many openings such as doors, trunks and hatchbacks. Historically, these openings have been difficult to seal effectively, such that the noise levels are acceptable to the occupants. Another concern is the way in which the component closes in the opening. Some users may prefer a firm close and seal of the door. Users do not want to have to slam a door when closing, to obtain a good seal from wind noise and from the elements, such as rain and dust.

In addition, the sealing elements of the opening must have good durability, such that the opening can be opened and closed repeatedly, without losing the sealing ability thereof. The elements used in sealing the openings must also be securely attached to the vehicle body, to prevent them from separating therefrom, with resulting poor performance.

The edge of the vehicle opening and/or the corresponding edge of the closure member have weather strip seals attached thereto, to aid in forming a good seal.

A number of different seal and weather strip devices are known for sealing the interior of vehicles from the exterior, providing impact resistance and enhancing the appearance of the opening.

It has been known to contact a weather strip seal with a sealing surface of a pillar garnish or molding, such as is shown in U.S. Pat. No. 5,806,247 to Yamamoto.

U.S. Pat. No. 6,309,011 to Matsuyama et al. discloses a garnish to cover a front pillar between the windshield and side door in an automotive vehicle.

U.S. Pat. No. 6,142,506 to Patel et al. discloses an Energy Absorbing Vehicle Trim with Airbag. Patel discloses a side airbag system for the mounting on the interior of the vehicle such as the A-pillar or roof rail. The system includes the inflatable restraint, energy absorbing means and a trim piece assembly.

U.S. Pat. No. 5,992,924 Noritake et al., discloses an impact energy-absorbing structure having flange joint portions and a pillar garnish, the energy absorber attached with conventional methods, such as screws. The garnish of Noritake et al. is attached to the energy absorber via clips.

U.S. Pat. No. 5,803,532 Karuppaswamy et al. discloses a molding with blades on the interior thereof. The blades are inserted into clips mounted to the body panel.

U.S. Pat. No. 5,163,730 to Welch discloses a pillar with a molding and an energy absorbing bracket therebetween. The bracket has a base mounted to the surface of the pillar and support portion bonded to the molding. The foot of the bracket engages the pillar and a buckling portion connects the foot to the mounting portion.

Much of the known art uses a friction fit of the garnish to the vehicle body structural components. While this may be adequate in some instances, a more secure attachment of the garnish to the vehicle is needed, to supplement the friction fit thereof.

Vehicle occupants appreciate and expect continuous improvements in vehicle seals to minimize external noise, and to provide attractive elements that aid in sealing the vehicle opening.

Although the known devices have some utility for their intended purposes, a need still exists in the art for an improved garnish, and for an improved garnish and seal assembly. In particular, there is a need for a garnish which will enable a manufacturer to securely affix the garnish to the opening of the vehicle in an improved manner that will seal effectively, decrease manufacturing complexity and cost, and will still provide an aesthetic appearance for the vehicle owner.

SUMMARY OF THE INVENTION

The present invention provides a garnish for use in conjunction with vehicle weather stripping to seal a vehicle opening. The present application also provides a combined garnish and seal apparatus, and a method of attaching same to a vehicle body structure.

In a first embodiment hereof, the present invention provides a molding garnish for use with a vehicle door sash. The garnish is attachable to the door sash frame. The garnish has a first end with at least one fore slot formed therein, and a second end having at least one aft slot formed therein. A weather strip seal and a plurality of seal clips are used in conjunction with the garnish, to provide a seal for a vehicle opening such as a door opening.

The garnish is alignable in registry with a weather strip seal and with the vehicle body portion. A first end of a seal clip can be attached to the weather strip seal, and a projecting portion of the seal clip can be inserted through a slot in the garnish, and into an aperture formed in the sash frame, to operatively attach both the garnish and the weather strip seal to the door sash frame.

The present invention also encompasses a kit of components for attaching to a vehicle body portion, including the garnish, a weather strip seal, and a plurality of seal clips.

The present invention also encompasses a method of attaching a garnish and a weather strip seal to a vehicle body panel, where the garnish has a first end and a second end.

The method involves a step of placing the garnish in contact with the vehicle body panel with slots in the garnish aligned with apertures in the vehicle body panel.

The method also involves a step of operatively attaching first and second seal clips to a weather strip seal. This seal clip attachment step may include substeps of stretchably deforming an opening in a weather strip seal, inserting an anchor portion of the seal clip into the opening in the seal, and allowing the seal to return to its normal configuration with the seal clip installed thereon.

The seal clips are attached to the weather strip seal with projecting portions of the seal clips extending outwardly away from the seal.

The method also includes a step of aligning the weather strip seal with the garnish.

The method further involves a step of inserting the projecting portions of respective seal clips through respective slots in the garnish and into respective apertures of the vehicle body portion, whereby the seal clips operatively attach and secure both the garnish and outer weather strip seal to the door sash frame.

Accordingly, it will be seen that the present invention provides a method and apparatus for use in sealing an opening in a vehicle, whether for a door, hatch back, hood opening, or trunk opening. The seal should be both water-resistant and dust-resistant, and minimize wind noise within the vehicle.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Figure 1:
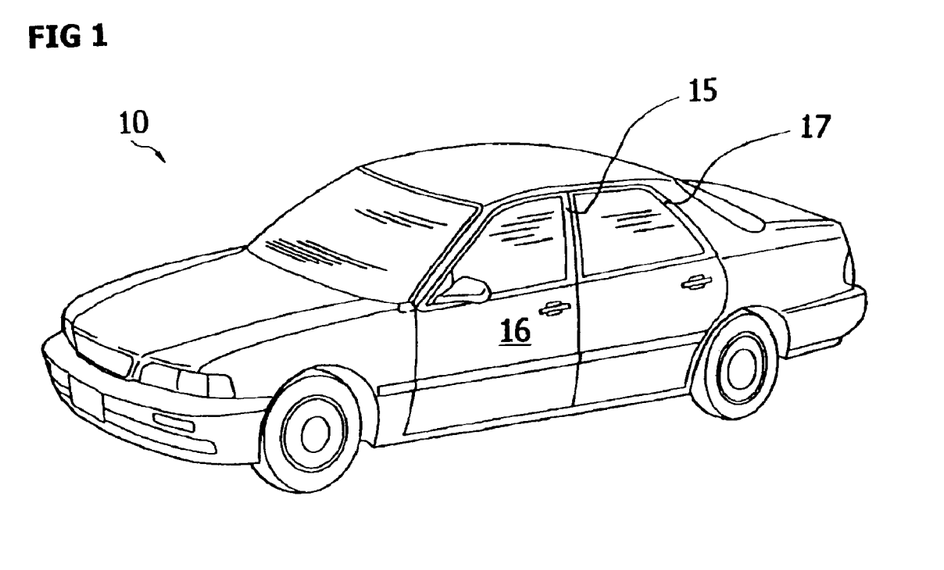
FIG. 1 is a perspective view of a vehicle, having a garnish installed therein.

Referring now to FIGS. 2–5 of the drawings, a garnish, according to a first illustrative embodiment of the present invention, is shown generally at 20. The garnish 20 of FIGS. 2–5 is provided for covering an inner portion of a front door sash 15 in a vehicle 10 (FIG. 1). The garnish 20 is mounted on the door sash 15, facing inwardly towards the passenger compartment, in the area where the door sash meets the door opening in the vehicle body when the door 16 is closed.

Throughout the present specification, relative positional terms like 'upper', 'lower', 'front', 'rear', 'top', 'bottom', 'horizontal', 'vertical', and the like are used to refer to the installed orientation of the garnish 20, as shown in the drawings. These terms are used in an illustrative sense to describe the depicted embodiments, and are not meant to be limitative. It will be understood that the depicted garnish 20 may be placed at an orientation different from that shown in the drawings, such as rotated through 90 or 180 degrees, and in such a case, the above-identified relative positional terms will no longer be accurate.

It will further be understood that another corresponding garnish (not shown) will be used for the opposite side of the vehicle 10, and that the corresponding garnish will have a substantially mirror-image structure to that of the depicted garnish 20.

The garnish 20 cooperates with respective inner and outer weather strip seals 50, 56 (FIG. 6A) to help seal off the interior of the passenger compartment from external noise, dampness, and dust.

Figure 2:
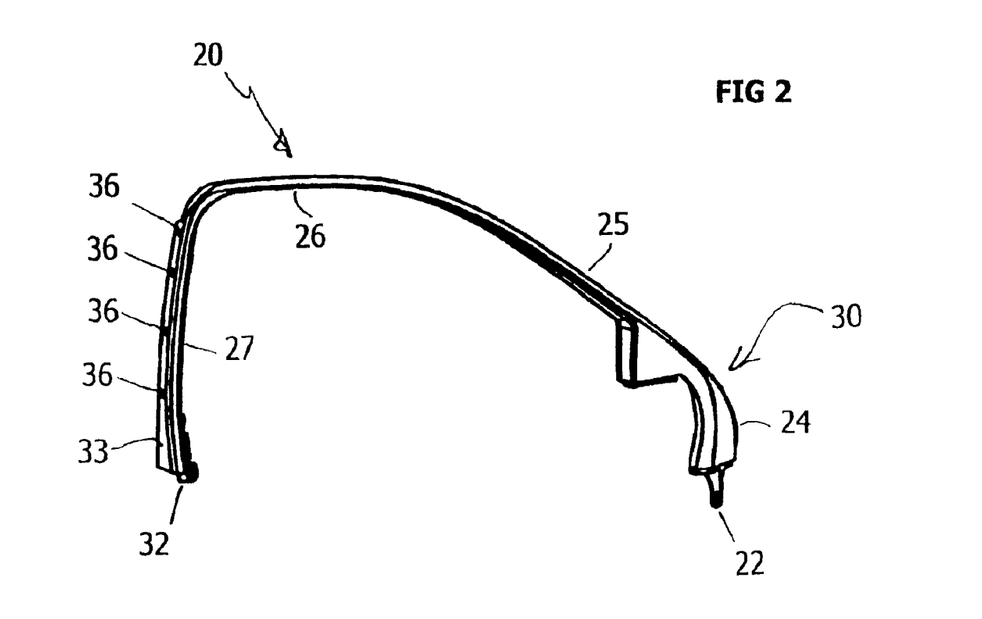
FIG. 2 is a perspective view of a garnish for a vehicle door sash according to a first illustrative embodiment of the invention, primarily showing an inward-facing surface thereof.
Figure 3:
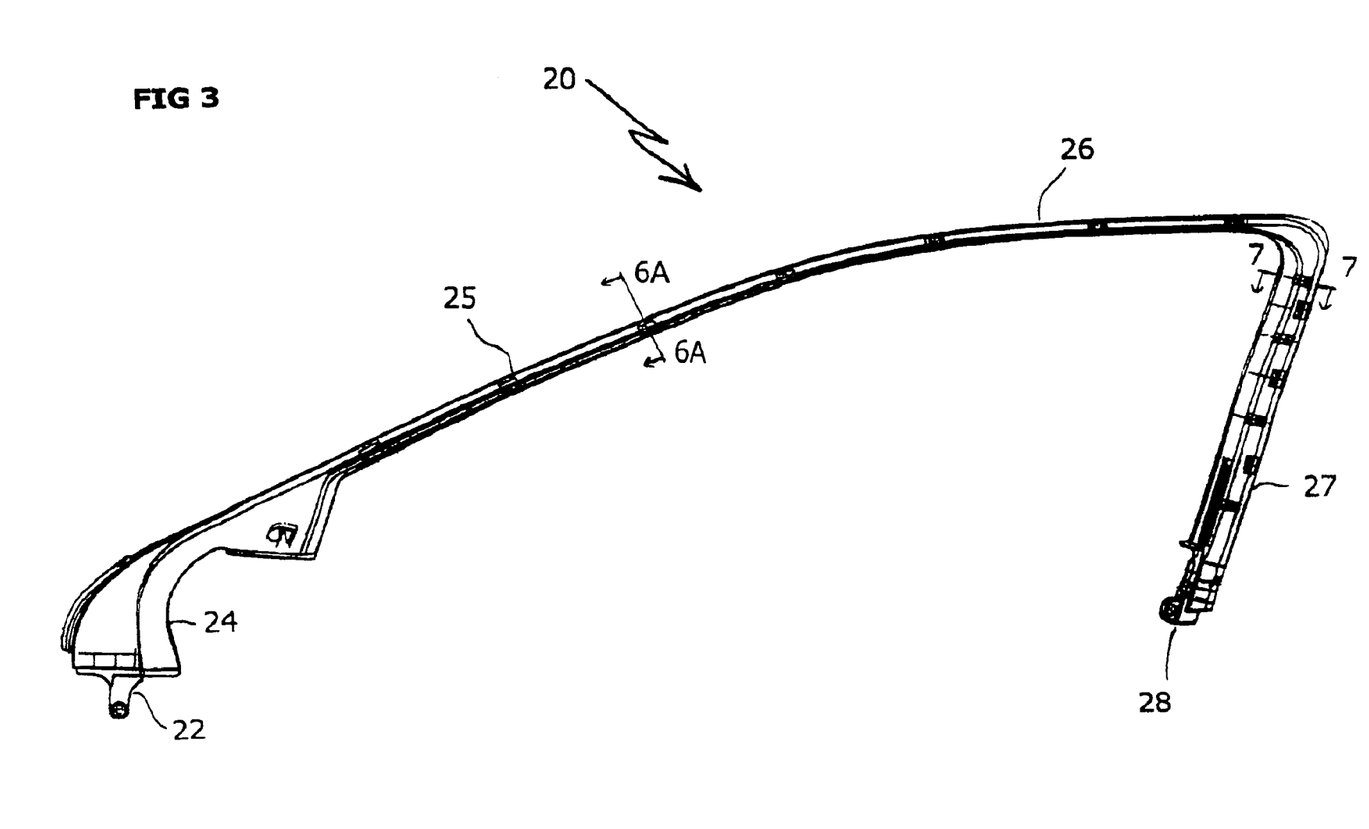
FIG. 3 is a side plan view of the outward-facing surface of the garnish of FIG. 2.

As seen best in FIGS. 2–3, the garnish 20 includes a first end 30 and a second end 32 opposite the first end.

The garnish 20 is formed of a flexible, resilient yet semi-rigid plastic or polymeric resin material, which has been fed into a mold and cured. The material selected should be stable at external temperatures throughout the normal range in which the vehicle is expected to operate.

The shape of the garnish 20 conforms to the shape of the component on which it fits, which in this case, is the sash 15 of the vehicle's front door 16. The garnish 20, in this first embodiment, has a non-linear shape, and it is to be understood that this particular shape shown is meant as an example only, and is not meant to limit the scope of this disclosure. A similar, although not identical garnish could be made in the shape of the sash 17 of the vehicle's rear door.

In the depicted embodiment, the garnish 20 includes a first substantially vertical front edge segment 24 at the front end 30, a curved sloping segment 25 extending upwardly from the top of the front edge segment, a top segment 26 extending substantially horizontally back from the end of the sloping segment, and a substantially vertical rear segment 27. All of the aforementioned garnish segments 24, 25, 26 and 27 are integrally formed as seamlessly interconnected sections of the garnish 20, and are sequentially coextensive.

Although the cross-sectional shape and configuration thereof varies at different points thereon, to conform to the shape of the sash frame 44 (FIG. 6A), the garnish 20 is generally made with a roughly C-shaped cross-section, to substantially surround and cover an interior-facing portion of the sash frame.

Figure 4A:
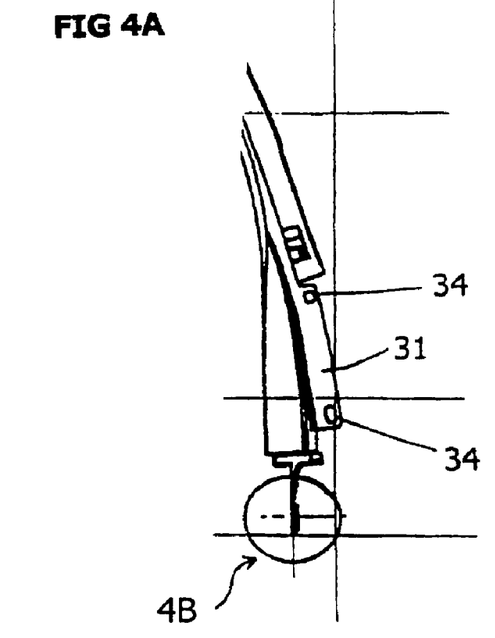
FIG. 4A is a front plan view, partially cut away, of the garnish of FIGS. 2–3.

As seen best in FIG. 4A, the front end 30 of the garnish 20 has at least one fore slot 34 formed therein, for use in securely mounting the garnish to the sash frame 44. The front end 30 of the garnish 20, according to the depicted embodiment, has two spaced-apart fore slots 34 formed therein. Other embodiments could have more or fewer fore slots 34, depending on the profile of the garnish 20, and the shape of the vehicle opening.

The back end 32 of the garnish 20 is also provided with at least one aft slot 36 (FIG. 2) formed in the rear segment 27 thereof. The rear segment 27 of the garnish, in the embodiment of FIGS. 2–5, has four spaced-apart aft slots 36 formed therein. More or fewer aft slots 36 could be used, depending on the profile of the garnish 20, and the shape of the vehicle opening.

Figure 4B:
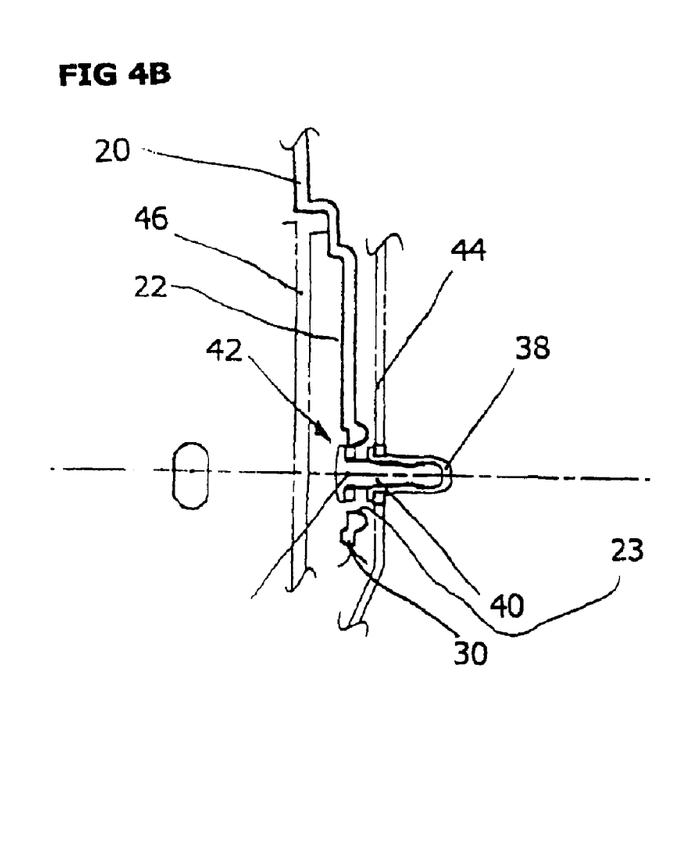
FIG. 4B is an enlarged detail view of part of the garnish end of FIG. 4A, taken in the circled area designated 4B in FIG. 4A, and also showing selected mounting hardware and a cut away portion of the vehicle door structure.

The garnish 20 also includes a first integral tab 22 extending downwardly from the lower tip end of the front edge segment 24. The first tab 22 has an eyelet 23 formed therein for receiving a first attachment stud 40 (FIG. 4B).

In similar fashion, the garnish 20 also includes a second integral tab 28 extending downwardly from the lower tip end of the rear edge segment 27. The second tab 28 also has an eyelet 29 formed therein for receiving a second attachment stud 41(FIG. 5B).

Figure 5A:
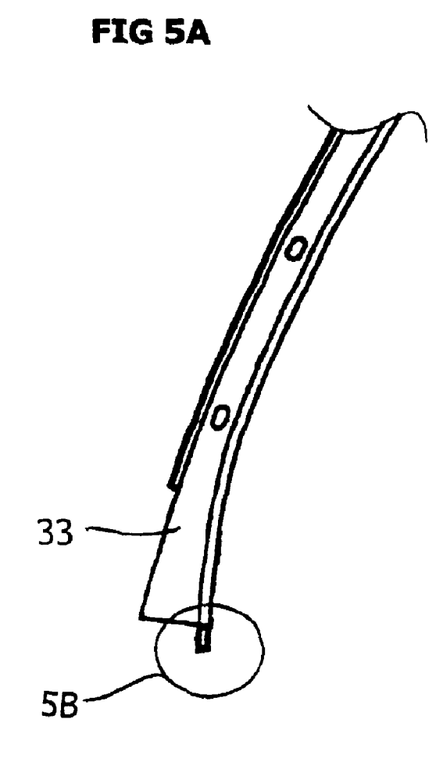
FIG. 5A is a rear plan view, partially cut away, of the garnish of FIGS. 2–3.
Figure 5B:
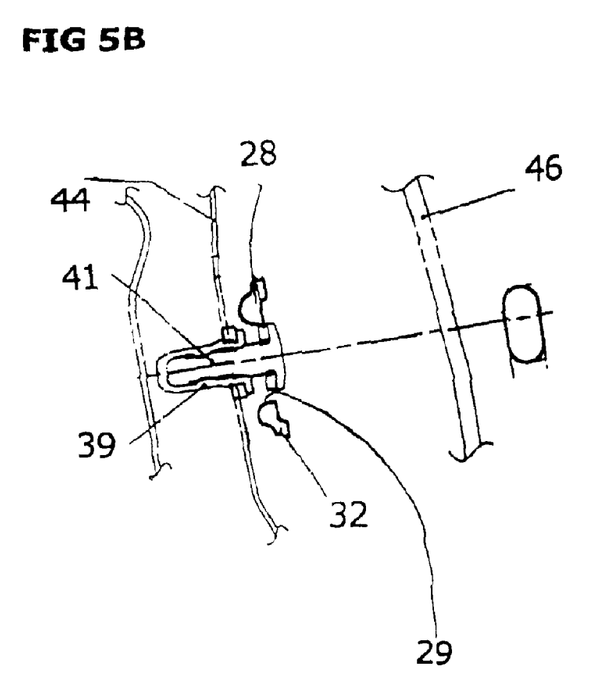
FIG. 5B is an enlarged detail view of part of the garnish end of FIG. 5A, taken in the circled area designated 5B in FIG. 5A, and also showing selected mounting hardware and a cut away portion of the vehicle door structure.

As seen best in FIGS. 4A and 5A, the garnish 20 may include respective front and rear integral attachment flanges 31, 33 thereon. The respective fore and aft slots 34, 36 are formed in the respective attachment flanges 31, 33.

Where the tabs 22, 28 are used as part of the garnish structure, the end portions 30, 32 of the garnish 20 may, optionally, be attached to the sash frame 44 in the following manner. The first, or front end 30 of the garnish 20 is attached to the door sash frame 44 (FIG. 4B) by a stud 40 placed through the eyelet 23 on the first tab 22, and then inserted into a first hollow, cup-shaped clip 38 embedded in the sash frame 44. Similarly, the second end 32 of the garnish 20 is attached to the door sash frame 44 using another stud 41 which passes through the eyelet 29 of the second tab 28, as shown in FIG. 5B, and is then inserted into a second hollow, cup-shaped clip 39 which has been embedded in the sash frame 44.

Figure 6A:
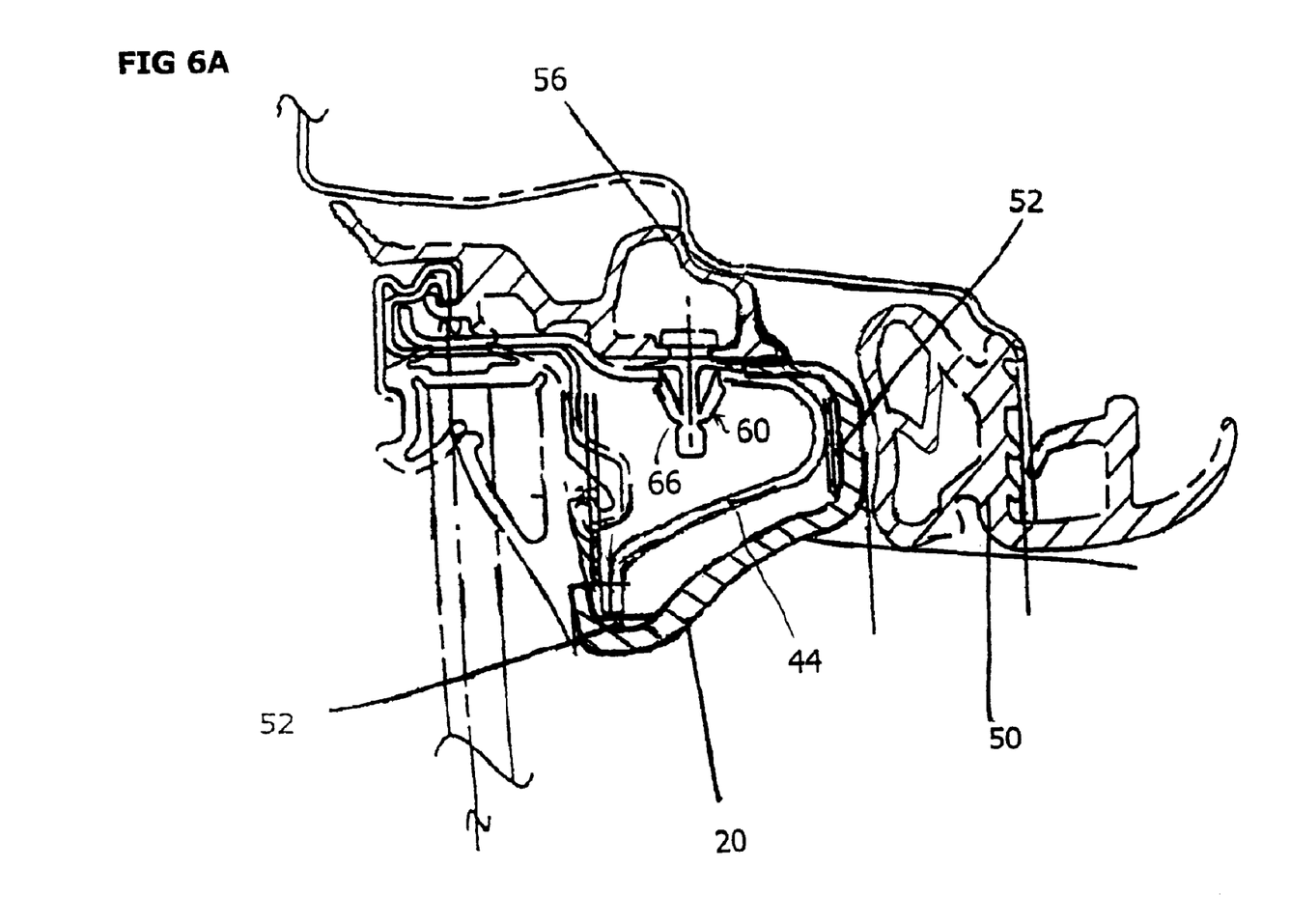
FIG. 6A is a cross-sectional detail view, taken along the line 6A—6A in FIG. 3, and showing the mounting interface between the inner weather strip seal, the garnish, and the door sash frame at a central portion of the door sash

FIG. 6A shows how a central part of the garnish 20 is affixed to the door sash frame 44, by pinching the garnish upper edge beneath the outer weather strip seal 56, which is held on to the door sash frame 44 by a series of clips, such as the seal clip 60 shown. The seal clip 60 includes a projecting portion 66, which fits into a corresponding opening formed in the door sash frame 44.

Figure 6B:
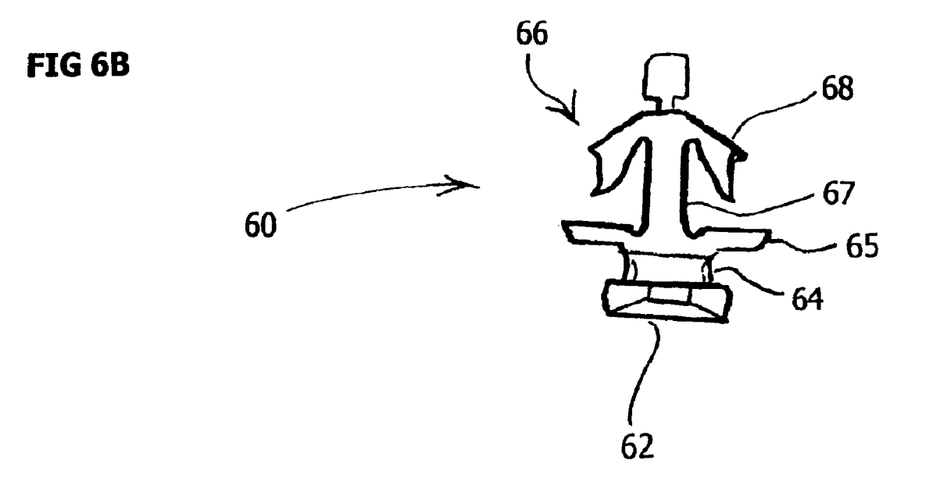
FIG. 6B is a detail side plan view of an attachment clip of the assembly of FIG. 6A.
Figure 6C:
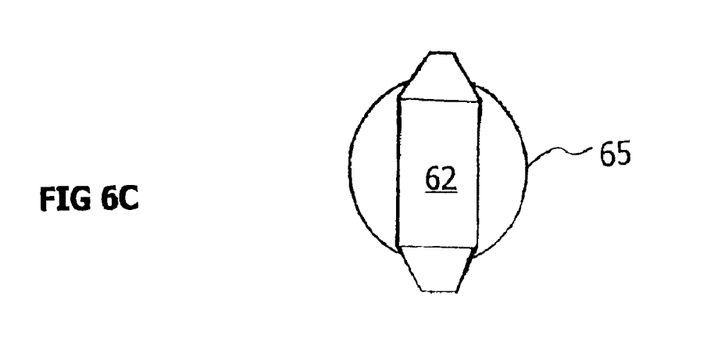
FIG. 6C is a detail bottom plan view of the clip of FIG. 6B.
Figure 7:
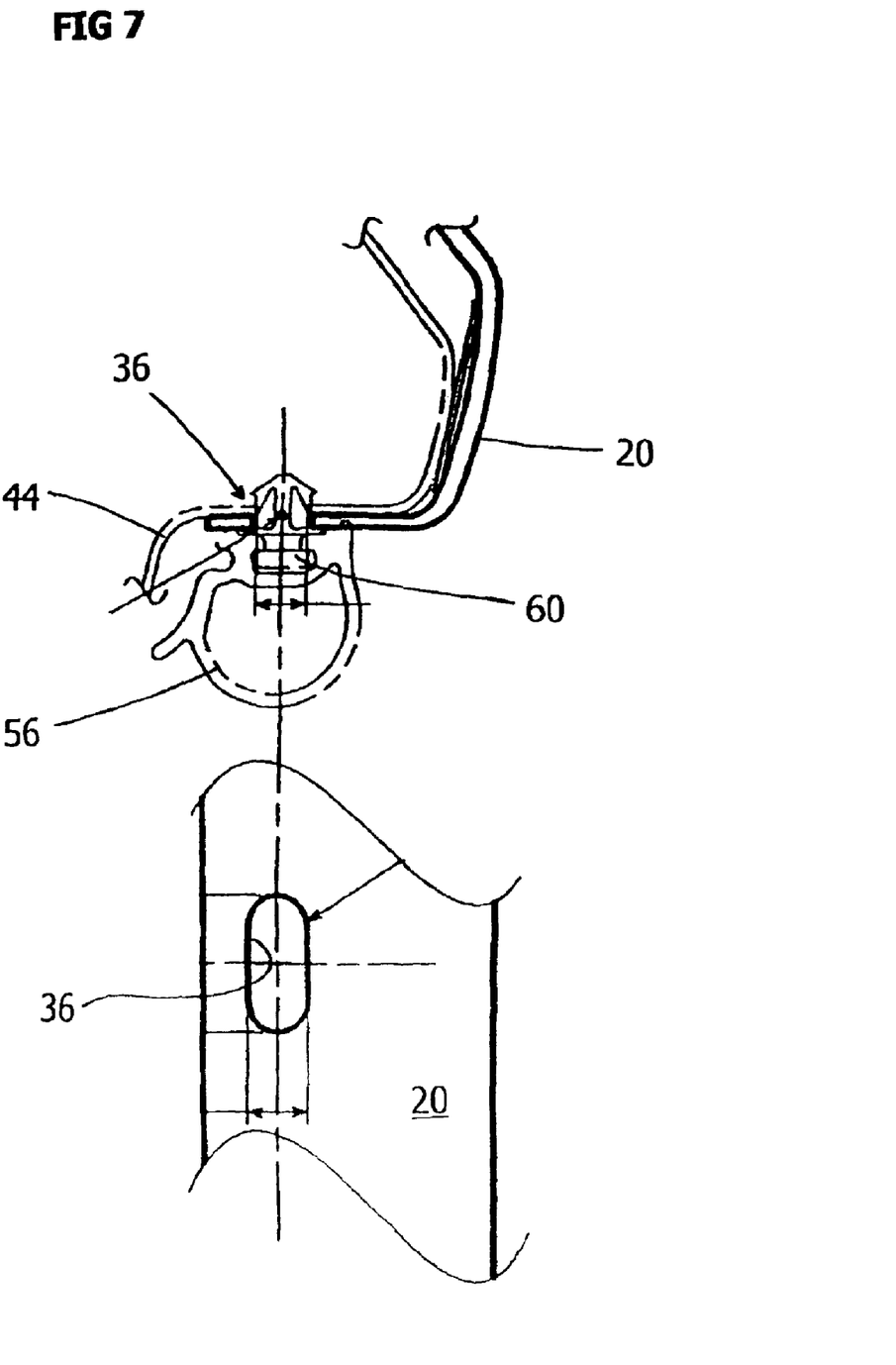
FIG. 7 is another cross-sectional detail view, taken along the line 7—7 in FIG. 3, and showing the mounting interface between the inner weather strip seal, the garnish and the door sash frame at an upper rear portion of the door sash.

The detailed structure of the seal clip 60 will now be described in reference to FIGS. 6B–6C. The seal clip 60 includes an anchor portion 62 at a first end thereof, for placement in a stretchable aperture formed in the base of the outer weather strip seal 56, and for maintaining a connection between the clip 60 and the seal 56 over time. The seal clip 60 narrows after the anchor 62 to form a reduced-diameter neck 64. A stop flange 65 extends outwardly on the clip 60 just beyond the neck 64. The stop flange 65 defines a wide part of the clip 60, and is provided for abutting against the side edges of the sash frame 44 adjacent a mounting aperture, and for limiting the extent to which the clip can pass into the hole in the frame, as shown in FIGS. 6A and 7.

The clip 60 also includes a projecting portion 66 consisting of a fir tree fastener projecting outwardly from the center of the stop flange 65, in a direction opposite from the anchor 62. The projecting portion 66 of the clip 60 is provided for inserting into an aperture in the sash frame 44. The fir tree fastener includes a central core portion 67, and a retainer cap 68 attached to the end of the core portion. The retainer cap 68 can be a single deformable piece, similar in shape to a mushroom cap, or alternatively, may take the form of two or more arms extending outwardly from the central core portion 67.

FIG. 4A shows the arrangement of the fore slots 34 in relation to the first end 30 of the garnish 20, while FIGS. 2 and 5A show the relationship of the aft slots 36 in relation to the second end 32. FIG. 5A shows a more detailed view of the arrangement and placement of two aft slots 36 in the lower portion of the rear segment 27.

FIG. 6A, taken along the line 6A—6A in FIG. 3, shows the intersection of the outer weather strip seal 56, the garnish 20 and the door sash frame 44, in an upper part of the door sash 15, where the outer weather strip seal 56 completely covers the edge portion of the garnish 20, and "pinches" the edge thereof. As shown in this figure, the garnish 20 is retained against the door sash frame 44 with a seal clip 60 attached both to the outer weather strip seal 56, and to the door sash frame 44, with the edge of the garnish 20 trapped therebetween. Optionally, the garnish 20 may include ribs 52 formed integrally on the interior thereof, as desired for reinforcement or spacing.

A seal clip 60 penetrates both the outer weather strip seal 56 and the door sash frame 44, and keeps tension thereon, to keep the edge of the garnish 20 trapped therebetween. Manufacturability is aided in that the garnish 20 is more securely attached to the door sash frame 44 and the seal clip 60 can fulfill two functions, that of attaching the garnish 20 and that of operatively attaching the outer weather strip seal 56 to the door sash frame.

Similarly, FIG. 7 shows the attachment of a seal clip 60 to the outer weather strip seal 56 and also to the door sash frame 44, with the garnish 20 trapped therebetween. However, in contrast to the arrangement shown in FIG. 6A, here, the garnish includes the rear attachment flange 33 with the aft slots 36 formed therein. Therefore, the projecting portion 66 of the seal clip 60 can pass through an aft slot 36 and then be inserted into the opening of the door frame 44, creating a more secure connection than that shown in FIG. 6A. One seal clip 60 of the outer weather strip seal 56 penetrates each of the aft slots 36, and secures both the garnish 20 and the outer weather strip seal 56 to the door sash frame 44.

Method of Attaching a Garnish

The present invention also relates to a method of attaching a garnish 30 to a vehicle body frame panel, such as the door sash frame 44 shown in the drawings.

Figure 8:
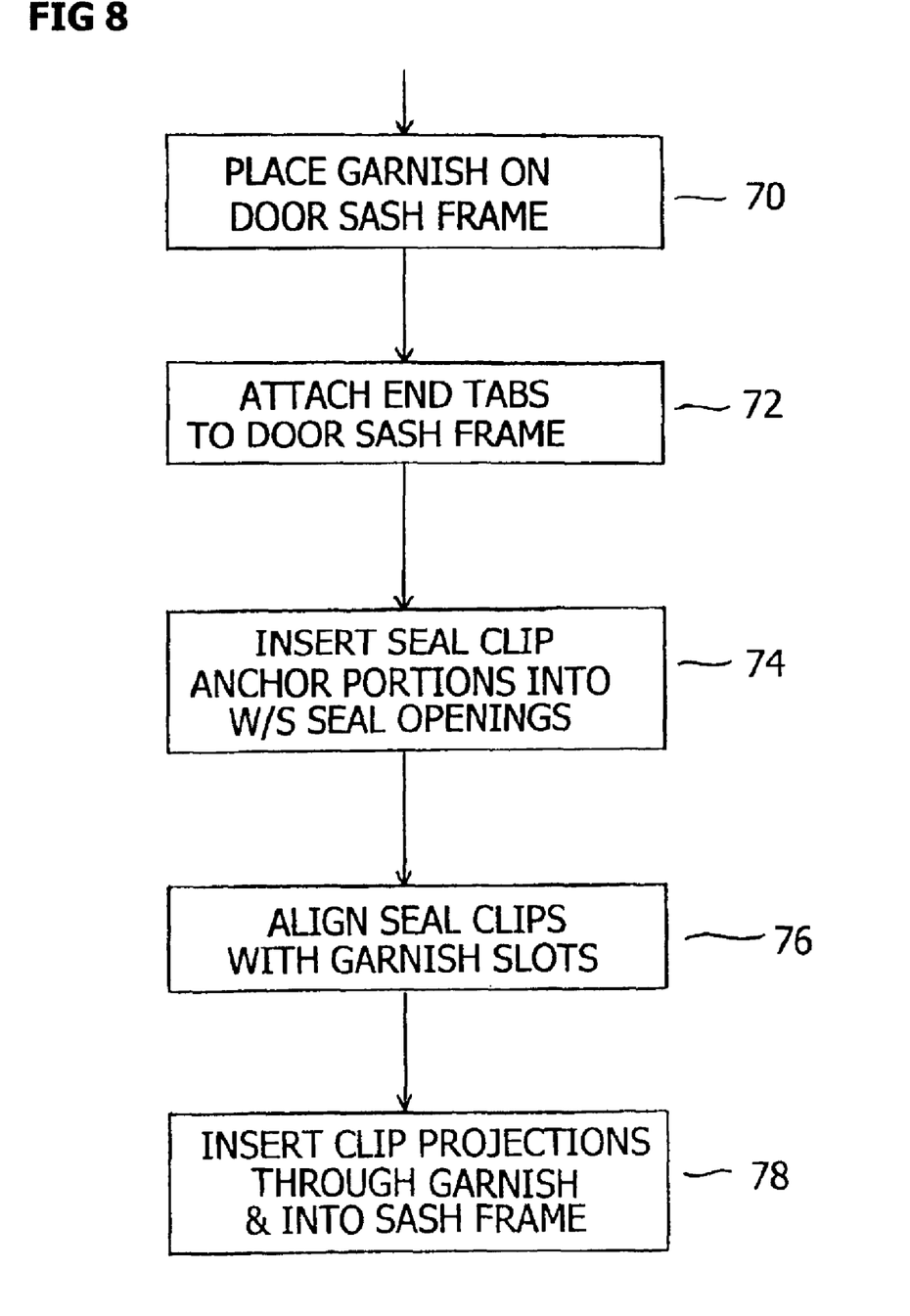
FIG. 8 is a simplified block diagram showing a sequence of steps in a method according to the invention.

A simplified block diagram showing selected steps in one embodiment of a method according to the invention is illustrated in FIG. 8.

The method involves a step 70 of placing the garnish 20 on the door sash frame 44. The garnish 20 may snap on to the sash frame 44 with a friction fit. It will be understood that the garnish 20 is placed on to the sash frame 44 with the fore and aft slots 34, 36 aligned with corresponding apertures in the sash frame 44.

Optionally, the method may also include a step 72 of attaching end tabs 22, 28, disposed on opposite ends of the garnish 20, to the door sash frame 44. This step may be omitted, if desired.

The method also includes a step 74 of operatively attaching first and second seal clips 60 to a weather strip seal 56. This first attachment step may include substeps of stretchably deforming an opening in a weather strip seal 56, inserting an anchor portion 62 of the seal clip 60 into the opening in the seal, and allowing the seal to return to its normal configuration with the seal clip installed thereon.

The method also involves a step 76 of aligning the weather strip seal 56 with the garnish 20, so that the seal clips 60 line up with the respective slots 34, 36 formed in the garnish.

The method also involves a step 78 of inserting projecting portions 66 of the first and second seal clips 60 through respective slots 34, 36 formed in the ends 30, 32 of the garnish 20, and into apertures in the door sash frame 44, to attach both the garnish and the weather strip seal 56 to the door sash frame.

Although the present invention has been described herein with respect to a limited number of presently preferred embodiments, the foregoing description is intended to be illustrative, and not restrictive. Those skilled in the art will realize that many modifications of the preferred embodiment could be made, which would be operable. All such modifications, which are within the scope of the following claims, are intended to be within the scope and spirit of the present invention. The claims hereof should be construed in accordance with the patent law, including the doctrine of equivalents.

What is claimed is:

1. A garnish for attaching to a vehicle body portion in cooperation with a weather strip seal and a plurality of seal clips, said garnish having a first end and a second end and having at least one fore slot formed therein proximate the first end, and at least one aft slot formed therein proximate the second end;

said garnish defining a profile between the first and second ends for partially covering said vehicle body portion, wherein said profile comprises an upper edge portion for placement above the vehicle body portion, a hook-shaped lower edge portion for substantially surrounding a lower edge of the vehicle body portion, and a bridge section disposed between the upper edge and hook portions;

said garnish being alignable in registry with the weather strip seal and with the vehicle body portion, such that for each of the respective fore and aft slots, a single clip attached to said weather strip seal can be inserted through the slot in the garnish and into a hole formed in the vehicle body portion, to attach both the garnish and the weather strip seal thereto.

2. A garnish for attaching to a vehicle body portion in cooperation with a weather strip seal and a plurality of seal clips, said garnish having a first end and a second end and having at least one fore slot formed therein proximate the first end, and at least one aft slot formed therein proximate the second end;

said garnish defining a profile between the first and second ends for partially covering said vehicle body portion;

said garnish being alignable in registry with the weather strip seal and with the vehicle body portion, such that for each of the respective fore and aft slots, a single clip attached to said weather strip seal can be inserted through the slot in the garnish and into a hole formed in the vehicle body portion, to attach both the garnish and the weather strip seal thereto;

wherein said vehicle body portion is a door sash frame which forms an upper part of the vehicle door.

3. The apparatus of claim 1, wherein said garnish has a first tab with an eyelet formed therein attached to said first end, and a second tab with an eyelet formed therein attached to said second end thereof.

4. The apparatus of claim 1, wherein the garnish comprises integral front and rear attachment flanges, with a plurality of fore slots formed in said front attachment flange, and a plurality of aft slots formed in said rear attachment flange.

5. A vehicle comprising the garnish of claim 1.

6. A door sealing apparatus for a vehicle door sash frame with a plurality of apertures formed therein, the assembly comprising:

a weather strip seal for attachment to the door sash frame, said weather strip seal having a plurality of spaced-apart openings formed therein;

a garnish having a first end with a plurality of fore slots formed therein, and having a second end with plurality of aft slots formed therein, said fore and aft slots of said garnish being alignable in registry with said openings of said weather strip seal; and a plurality of seal clips for affixing the outer weather strip seal and garnish to the door sash frame apertures, said seal clips being operatively attachable to the weather strip seal at the openings thereof;

wherein said garnish and weather strip seal are constructed and arranged to allow projecting portions of the seal clips to pass through the garnish slots, and to enter and lodge in the door sash frame apertures, thereby securing both the outer weather strip seal and garnish to the door sash frame.

7. A vehicle comprising the apparatus of claim 6.

8. A kit of components for attachment to a door sash frame having a plurality of apertures formed therein, comprising:

a garnish having a first end and a second end, each of said first and second ends having a plurality of fore slots formed therein, said garnish defining a profile between the first and second ends for friction fitting to the door sash frame and for covering a portion of the door sash frame;

a weather strip seal for attachment to the door sash frame, and a plurality of seal clips for attachment to slots in the door sash frame, said seal clips being operatively attachable to said weather strip seal;

wherein the seal clips comprise projecting portions which are operable to penetrate the respective fore and aft slots of the garnish and to lodge in the apertures of the door sash frame.

9. A method of attaching a garnish and a weather strip seal to a vehicle body portion, comprising the steps of:

a) placing said garnish in contact with said vehicle body portion, with slots in said garnish aligned with corresponding apertures in said vehicle body portion, wherein said garnish has a first end and a second end, b) operatively attaching a plurality of seal clips to said weather strip seal with projecting portions of said seal clips extending outwardly away from said seal; and c) inserting said projecting portions of respective seal clips through the slots in said garnish and into the apertures in said vehicle body portion;

whereby said seal clips operatively attach and secure both the garnish and the outer weather strip seal to the vehicle body portion.

10. The method of claim 9, further comprising a step of attaching respective tabs at the front and rear of said garnish to said door sash frame.

11. The method of claim 9, wherein said step of installing said seal clips into said weather strip seal comprises the steps of:

stretchably deforming an opening in the weather strip seal, inserting an anchor portion of a seal clip into the opening in the seal, and allowing the seal to return to its normal configuration with the seal clip installed thereon.

12. The method of claim 9, wherein at least one of said slots is situated near the first end of said garnish, and at least one of said slots is situated near the second end of said garnish.

* * * * *

UNITED STATES PATENT AND TRADEMARK OFFICE
CERTIFICATE OF CORRECTION

PATENT NO. : 6,811,194 B1
DATED : November 2, 2004
INVENTOR(S) : Gaertner et al.

It is certified that error appears in the above-identified patent and that said Letters Patent is hereby corrected as shown below:

Column 3,
Line 44, at the end of the line, insert a period.

Column 7,
Line 67, change "second end with plurality" to -- second end with a plurality --.

Signed and Sealed this

First Day of March, 2005

JON W. DUDAS
*Director of the United States Patent and Trademark Office*